United States Patent [19]
Ogawa

[11] Patent Number: 5,825,733
[45] Date of Patent: Oct. 20, 1998

[54] OPTICAL DISC RECORDING APPARATUS FOR RECORDING DATA AT A DISC ROTATIONAL SPEED SELECTED FROM A RANGE OF DISC ROTATIONAL SPEEDS

[75] Inventor: Hiroshi Ogawa, Kanagawa, Japan

[73] Assignee: Sony Corporation, Tokyo, Japan

[21] Appl. No.: 938,476

[22] Filed: Sep. 30, 1997

Related U.S. Application Data

[63] Continuation of Ser. No. 26,272, Mar. 4, 1993, abandoned, which is a continuation of Ser. No. 734,936, Jul. 24, 1991, abandoned.

[51] Int. Cl.$^6$ ........................................................ G11B 7/00
[52] U.S. Cl. ............................................. 369/50; 369/47
[58] Field of Search .................................. 369/50, 47, 48, 369/59, 32, 124, 240, 189, 51, 44.13, 44.26; 360/73.03, 73.02, 70

[56] References Cited

U.S. PATENT DOCUMENTS

| | | | |
|---|---|---|---|
| 4,338,683 | 7/1982 | Furukawa et al. | 369/50 |
| 4,375,088 | 2/1983 | de Haan et al. | 369/48 X |
| 4,386,300 | 5/1983 | Ogawa | 369/50 |
| 4,397,011 | 8/1983 | Ogawa | 369/50 |
| 4,603,412 | 7/1986 | Yamazaki | 369/50 |
| 4,691,310 | 9/1987 | Wine | 369/50 |
| 4,907,216 | 3/1990 | Rijnsburger | 369/44.39 |
| 5,036,508 | 7/1991 | Okano | 369/50 |
| 5,077,721 | 12/1991 | Sako et al. | 369/59 |
| 5,109,369 | 4/1992 | Maeda et al. | 369/50 |
| 5,163,035 | 11/1992 | Horikiri | 369/47 |

FOREIGN PATENT DOCUMENTS

| | | |
|---|---|---|
| 0 280 425 | 8/1988 | European Pat. Off. . |
| 0 299 573 | 1/1989 | European Pat. Off. . |
| 0 399 852 | 11/1990 | European Pat. Off. . |
| 2062905 | 5/1981 | United Kingdom . |

OTHER PUBLICATIONS

Patent Abstracts of Japan, vol. 12, No. 114, (P–688) 12 Apr. 1988, & JP–A–62 243 164 (Pioneer Electronic Corp) 23 Oct. 1987.

Patent Abstracts of Japan, vol. 9, No. 157 (P–369) (1880) 2 Jul. 1985 & JP–A–60 32 161 (Mitsubishi Denki K K) 19 Feb. 1985.

Patent Abstracts of Japan, vol. 9, No. 227 (P–388) (1950) 13 Sep. 1985 & JP–A–60 83 258 (Sanyo Denki K K) 11 May 1985.

*Primary Examiner*—Thang V. Tran
*Attorney, Agent, or Firm*—Limbach & Limbach L.L.P.

[57] ABSTRACT

The present invention provides an optical disc recording apparatus for recording on an optical disc which is preliminarily formed with recording tracks replaced in a track width direction in response to first data signals second data signals along the recording tracks in a track direction in which a desired recording speed is made selectable independently of the recording pattern of preliminarily recorded first data signals by changing the reference frequency when the disc rotation is controlled depending upon the speed during data recording so that the frequency of clocks obtained by reproducing the first data signals becomes a given reference frequency.

7 Claims, 2 Drawing Sheets

RELATION BETWEEN ERROR
RATE AND INTENSITY OF LIGHT

OPTICAL DISC RECORDING APPARATUS FOR RECORDING DATA AT A DISC ROTATIONAL SPEED SELECTED FROM A RANGE OF DISC ROTATIONAL SPEEDS

This is a continuation of application Ser. No. 08/026,272 filed on Mar. 4, 1993, now abandonded, which is a continuation of application Ser. No. 07/734,936 filed on Jul. 24, 1991, now abandonded.

The present invention relates lo an optical disc recording apparatus, and in particular to an optical disc recording apparatus in which recording of predetermined data is performed while reproducing said predetermined data which have been preliminarily recorded on the optical disc by the displacement of recording tracks in a width direction thereof.

Writable optical discs such as write-once optical discs and magneto-optical discs have been known in which tracking guide prooves are preliminarily formed thereon in a spiral or concentrical manner before data recording and the preliminarily formed grooves, so-called pregrooves or lands between the grooves are used as recording tracks for recording and reproducing data along the recording tracks in a direction of tracks. Tracking servo control is performed by optically detecting the pregrooves during recording and reproducing.

A format has been proposed in which grooves per se are displaced in a track width direction on an optical disc using said pregrooves as recording tracks and control information such as address or synchronization information is recorded by the displacement of the tracks in a width direction of the tracks. For example, Japanese Unexamined Patent Publication No. Sho 63-87682 discloses a technique for forming wobbling tracks by wobbling recording tracks in a track width direction in accordance with signals which are FM modulated with absolute time information. In this technique, the wobbling tracks are formed by wobbling the tracks in a width direction of the tracks in accordance with signals which are obtained by FM modulating a sinusoidal carrier signal of 22.05 kHz with absolute time code having a frequency sufficiently lower than that of the carrier. This format is also called to as absolute time in pregroove (ATIP).

When the data are recorded on an optical disc of the ATIP format, disc rotation servo control is performed by servo controlling a spindle motor so that the frequency of the detected pregrooves becomes a predetermined value (the FM carrier has a frequency of 22.05 kHz.

In the so-called CD format, the line speed may be selected to a desired value in the range of 1.2 to 1.4 m/s. For example, the line speed may be desiredly selected in view of, for example, ease of stamping on manufacturing depending upon the size of minimum pits and music program period of time. The maximum period of time of recording on disc may be selected to a desired period of time in the range of 72 to 60 minutes (or it is also said that it is 74.7 to 65 minutes) depending upon the line speed 1.2 to 1.4 m/s.

If a recordable optical disc of the ATIP format, which is compatible with the CD format is assumed, the pregrooves which are wobbled at a given frequency of the carrier would be formed at a different recording wave length depending upon the line speed. Accordingly, it is necessary to supply a plurality of kinds of optical discs which are formed with pregrooves having different recording wave length depending upon respective line speeds in order to cope with plural line speeds in the range of, for example, 1.2 to 1.4 m/s as mentioned above when the recordable optical discs are put on the market.

If a plurality of kinds of optical discs for the different line speeds are supplied, disc manufactures must manufacture the plural kinds of discs, which may cause production efficiency to lower and inventory control costs more labor for vendors with increase in the number of kinds of discs and the quantity of stocked discs tends to increase since a rich assortment of various discs should be kept in stock. This is not desirable.

Unification of optical discs into optical discs having a minimum line speed of 1.2 m/s to satisfy a maximum recording period (capacity) for preference of recording period is possible.

It is found from a curve A in FIG. 2 showing the relation between the error rate and the intensity of light (power) at a line speed of 1.2 m/s that there is less tolerance in the range of intensity of light (so-called error window) to provide an error rate not less than a given value. Since this increases a load upon light intensity control (APC), lowering the line speed to 1.2 m/s is desired to be avoided if no needed.

A curve B in FIG. 2 shows for reference the relation between the light intensity and the error rate at a line speed of 1.4 m/s. It is found from this curve that the range of light intensity is wide for the error rate not higher than a given value and there is much tolerance. Since the demand for the recording period of time (capacity) is contradictory to the demand for the error window, it is undesirable to supply one kind of optical disc having only on line speed.

The present invention was made in view of such circumstances. It is an object of an optical disc recording apparatus which is capable of recording at different plural line speeds without using a plurality of kinds of optical discs.

SUMMARY OF THE INVENTION

In order to accomplish the above-mentioned object, there is provided an optical disc recording apparatus for recording on an optical disc which is preliminarily formed with recording tracks replaced in a track width direction in response to first data signals second data signals along the recording tracks in a track direction, comprising means for controlling the disc rotational speed so that the frequency of clocks obtained by reproducing the first data signals recorded by the displacement in the recording track width direction, and means for controlling the reference frequency depending upon a desired recording speed selected during the recording of the second data signals.

The recording tracks which are preliminarily formed by being displaced in a track width direction in accordance with the first data signals may be grooves (so-called pregrooves), etc, formed by being wobbled in a tracks width direction in accordance with wobbling signals obtained by FM modulating a given carrier (having a frequency, for example, 22.05 kHz) with absolute time codes. When user's recording data which are the second data are recorded, components of wobbling signals on the pregrooves are reproduced and servo control of the disc rotation is performed so that the frequency of the clocks becomes a given reference frequency. The reference frequency is changed in consideration of, for example, disc recording capacity, etc. to provide a desired line speed.

A desired data recording speed can be selected independently of recording pattern of the preliminarily recorded first data signals by changing, depending upon the data recording speed, the reference frequency which will become a desired control value of the clock frequency obtained by reproducing the first data signals recorded in a track width direction.

DESCRIPTION OF PREFERRED EMBODIMENTS

Figure 1:
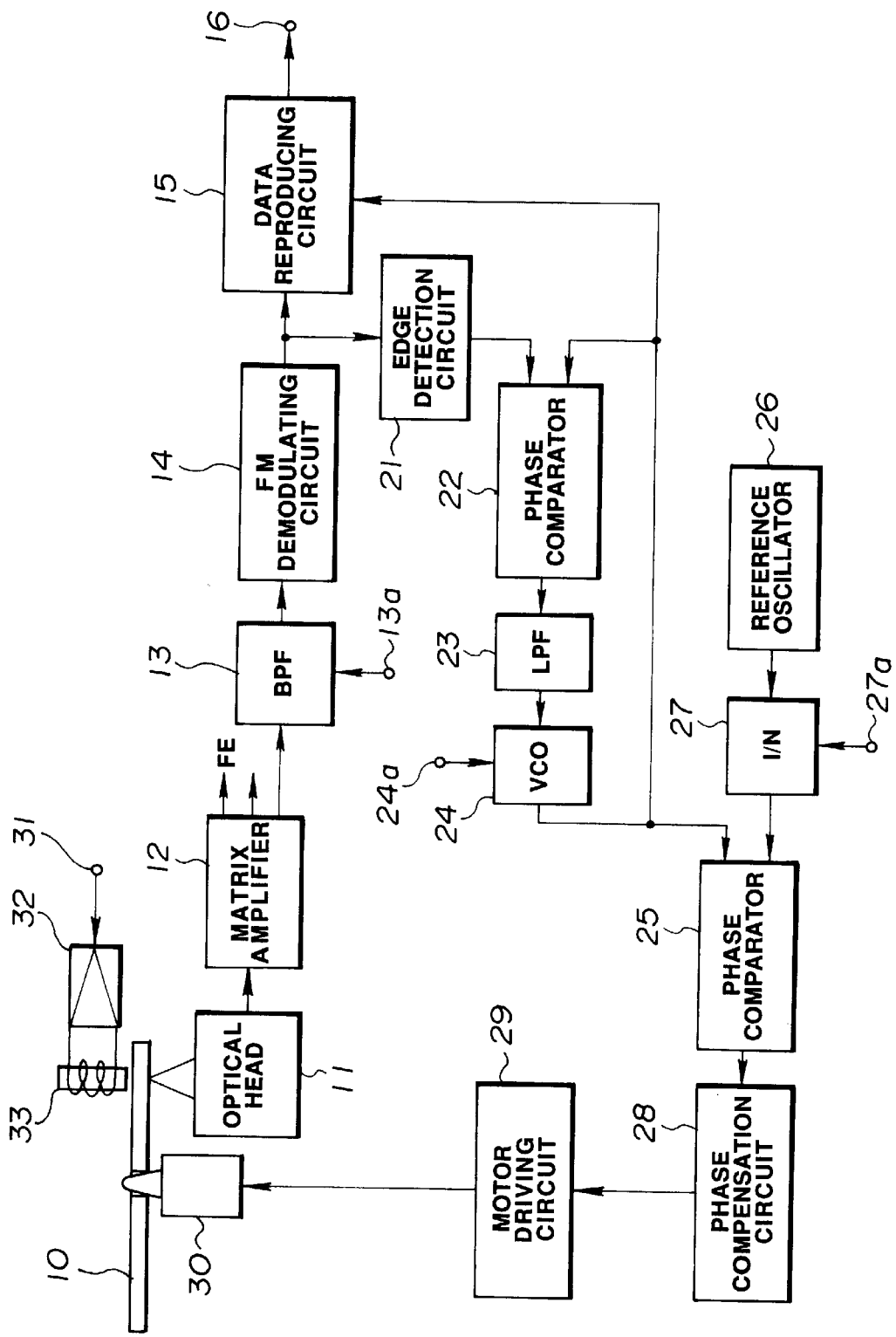
FIG. 1 is a block diagram showing the schematic structure of an embodiment of an optical disc recording apparatus In accordance with the present invention.
Figure 2:
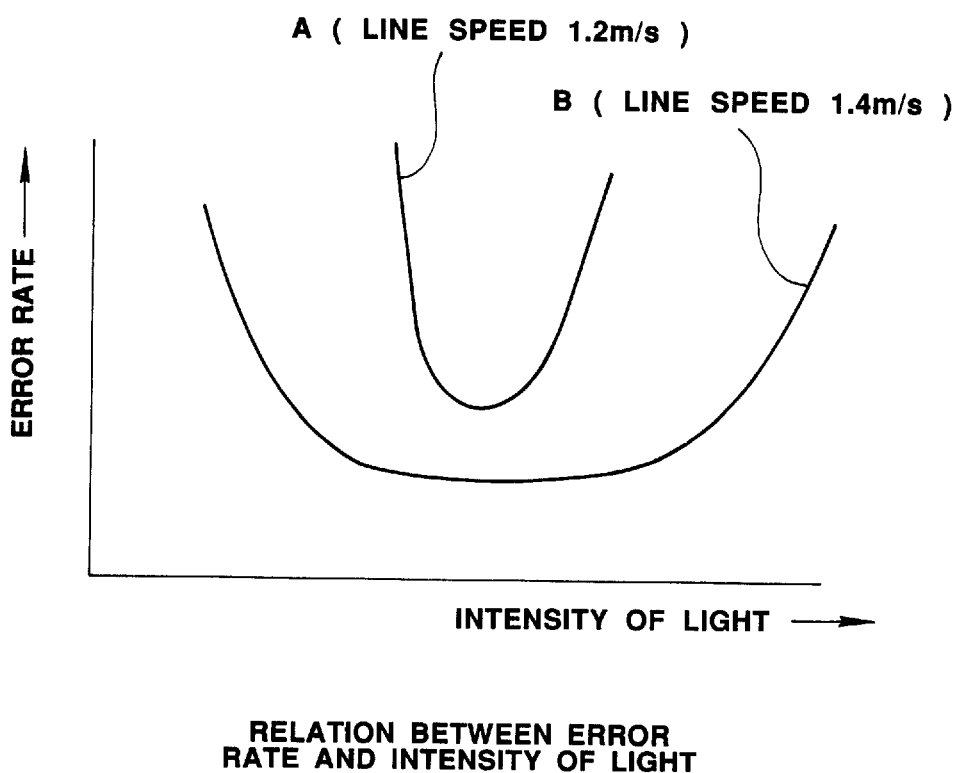
FIG. 2 is a graph showing the relation between the intensity of light and the error rate.

FIG. 1 is a block diagram showing the schematic structure of a first embodiment of an optical disc recording apparatus in accordance with the present invention.

In the optical disc recording apparatus shown in FIG. 1, an optical disc 10 which is a recordable recording medium comprises, for example, a magneto-optical disc. The optical disc 10 is preliminarily recorded and formed (so-called preformatted) with pregrooves which are wobbled in a width direction of a recording track by signals which are FM modulated with absolute time information. That is, a predetermined sinusoidal carrier signal of, for example, 22.05 kHz is FM modulated with an absolute time code having a relatively lower frequency than that of the carrier to form a wobbling signal. Wobbling tracks which are displaced in a track width direction with the wobbling signals are formed on the disc 10.

The format in which wobbling tracks are preliminarily recorded and formed in accordance with wobbling signals carrying such an absolute time data is also referred to as absolute time in pregroove (abbreviated to as ATIP) format.

When data are written on such an optical disc 10, a component of the carrier signal which is a clock signal is extracted from a signal obtained by playing back the pregrooves and disc rotational speed is controlled so that the frequency of the reproduced carrier component becomes equal to a predetermined reference frequency.

The wobbling tracks which are displaced in a track width direction in accordance with the wobbling signal having a carrier frequency of 22.05 kHz are preliminarily recorded and formed (so-called preformatted) on the optical disc 10 at a given line speed, for example, 1.4 m/s. If the reference frequency which is a desired value of the reproduced carrier frequency is assumed as 22.05 kHz, in this case, the disc would be controlled to be rotated at the same line speed (1.4 m/s) as the speed during preformatting. If the reference frequency is preset to a given value lower than 22.05 kHz, servo control of the disc rotation would be performed to provide a given line speed lower than 1.4 m/s. In an embodiment of the present invention, a desired recording speed is made selectable by changing and presetting at least the reference frequency to a value depending upon a desired line speed.

In FIG. 1, optical detection signals are fed to a matrix amplifier 12 from an optical head 11 comprising a laser light source, a lens system, a beam splitter, a photo-detector and the like. So-called main push-pull outputs are fed to a BPF (band pass filter) 13 from the matrix amplifier 12. BPF 13 outputs a radio frequency component (a component having a frequency in the vicinity of the carrier frequency of 22.05 kHz) of the main push-pull outputs, that is, a wobbling signal of the pregrooves. The low frequency component of the main push-pull output is a so-called tracking error signal.

A focus error signal can be obtained based upon an detection output from the matrix amplifier 12. Focussing and tracking control of an objective lens of the optical head 11 is performed in response to the focus error signal together with the above-mentioned tracking error signal.

It is preferable to use as the BPF 13a variable BPF in which the pass band is changed in response to a control signal from a control terminal 13a. The wobbling signal obtained from the BPF 13 is fed to a FM demodulating circuit 14 in which it is FM-demodulated into an ATIP (absolute time in pregroove) signal which is the above-mentioned absolute time data signal. The ATIP signal has a data reproducing PLL clock frequency of 6.3 kHz and a data clock frequency of 3.15 kHz. An ATIP data reproducing circuit 15 reproduces data from the ATIP signals in response to clocks from a PLL circuit system which will be hereafter described and feeds the reproduced ATIP data to an output terminal 16. For example, a pulse count type FM demodulator may be used as the FM demodulating circuit 14.

The ATIP signals from the FM demodulating circuit 14 are fed to a phase comparator of the PLL circuit system via an edge detecting circuit 21. Output signals from the phase comparator 22 are fed to a VCO (voltage controlled oscillator) 24 via a LPF (low pass filter) 23. Oscillation output signals from the VCO 24 are fed to the phase comparator 22. Output signals from the VCO 24 are fed to the data reproducing circuit 15 as PLL output signal. It is preferable to use the VCO 24, the resonant frequency of which is changed in response to control signals from the control terminal 24a.

The PLL output signals from the VCO 24 are fed to the phase comparator 25, which is supplied with a reference signal obtained by dividing the frequency signal from a reference oscillator 26 by N in a 1/N frequency divider 27. The 1/N frequency divider 27 has a control terminal 27a which is supplied with a frequency dividing ratio control signal. The frequency of the reference signal supplied to the phase comparator 25 is changed by changing the frequency dividing ratio depending upon a desired line speed during data recording. A phase comparison output signal from the phase comparator 25 is supplied to a motor driving circuit 29 via a phase compensation circuit 28. The motor drive circuit 29 controls the rotation of a spindle motor 30 for rotating the optical disc 10.

If the reference frequency from the 1/N frequency divider 27 is preset as 6.3 kHz as mentioned above, drive for rotating the disc is controlled so that the frequency of the wobbling signal is 22.05 kHz. The line speed at this time is 1.4 m/s. In contrast to this, if the reference frequency is set to a given value (for example, about 6.0 kHz) lower than 6.3 kHz by changing the frequency dividing ratio of the 1/N frequency divider 27 with the control signal to the control terminal 27a, drive for rotating the disc is controlled so that the frequency of the wobbling signals reproduced from the disc becomes a corresponding value (for example, about 21.0 kHz). The line speed at this time is a given value (for example, 1.33 m/s) lower than 1.4 m/s. When the line speed of a given value is attained by control of the rotation drive of the disc, informational signals to be recorded which are supplied to an input terminal 31 are subjected to a predetermined modulation and are supplied to the input terminal 31. The informational signals are then supplied to a magnetic head 33 for generating an external magnetic field via a head amplifier. A recording beam is impinged upon the disc from the optical head 11 for recording the informational signals on the magneto-optical disc while the modulated magnetic field depending upon the information to be recorded upon the magneto-optical disc 10 is applied thereon.

Although the shape of the pregrooves preformatted on the optical disc 10 is standardized to one format (the wobbling signals having a carrier frequency of 22.05 kHz is recorded at a line speed of 1.4 m/s), the disc can be rotated at a desired line speed by changing the desired frequency of the disc rotation servo so that any desired recording speed can be obtained. This enables the recording capacity (recording time) of one kind of preformatted optical disc to be selected to a desired value within the range from 72 to 60 minutes (or form 74.7 to 65 minutes) corresponding to the range of the line speed, for example, from 1.2 to 1.4 m/s. Data recording can be achieved by selecting an optimal recording speed in consideration of balance with a fact that the error rate is improved as the line speed increases.

Accordingly, if only a single kind of the above-mentioned recordable preformatted optical discs are put on the market, the users can carry out data recording at a desired line speed determined by a compromise between the necessary recording capacity 1 (recording time) and the error rate and the freedom degree of the optical disc recording is enhanced. Since it will suffice for the manufactures to manufacture and sell only one kind of preformatted optical discs, it is very advantageous in view of production efficiency and inventory control.

It is preferable to control the pass band of the BPF 13 and the central oscillation frequency of the VCO 24, etc. by control signals supplied to the control terminals 13a and 24a as well as to change the frequency dividing ratio depending upon the selected line speed when data are recorded on the optical disc. This is not essential. For example, if the pass band of the BPF 13 is wide to some extent, it is not necessary to make the pass band variable depending upon the selected line speed. If the lock range and the capture range of the PLL circuit system is wide, it is not necessary to make variable the central oscillation frequency of the VCO 24. In contrast to this, changing the reference frequency depending upon the line speed is essential. Various arrangements in which reference oscillation frequency per se is changed or the ratio of frequency division of the output signals from the VCO 24 is changed may be used as well as an arrangement in which the 1/N frequency divider 27 is used to control the ratio of the frequency division. It is, of course, possible to use various magneto-optical discs or write-once optical discs as recordable optical discs. ((Informational signals to be recorded are supplied to an optical head in a recording apparatus for the write-once optical disc using an organic pigment system recording material.))

As is apparent from the foregoing, in accordance with an optical recording apparatus of the present invention, a desired data recording speed can be selected independently of the recording pattern of first data signals preliminarily recorded on the disc by controlling the disc rotational speed so that the frequency of the clocks obtained by reproducing the first data signals recording by the displacement in a track width direction becomes equal to a predetermined reference frequency and by changing the reference frequency depending upon the desired recording speed selected during recording of second data signals in a track direction of the recording track. Therefore, if only single kind of optical discs are supplied, the users can freely record data at various line speeds. An optical disc recording apparatus which is convenient and valuable for both the suppliers and users of the optical discs can be implemented.

What is claimed is:

1. A recording apparatus for recording data on an optical recordable disc which is formed with a pre-groove wobbled in a radial direction thereof by a wobbling signal generated by address data and a carrier signal, said carrier signal having a predetermined frequency, said recording apparatus comprising:

a spindle motor for rotationally driving the disc at a constant linear velocity in a range from 1.2 m/sec to 1.4 m/sec;

a head device for recording information data on the disc along the pre-groove and for reading out an information signal from the disc, said head device being configured for scanning the pre-groove of the disc;

a decoder coupled to receive an output signal from the head device which is obtained by scanning the pre-groove and configured for extracting the carrier signal from the output signal received from said head device;

a clock generator for generating a reference clock signal by variably dividing a fundamental clock signal according to an external control signal, where the external control signal is defined by a desired recording capacity and a desired error rate for recording the information data on the disc; and a controller coupled to the clock generator and to the decoder, and having a phase comparator for comparing the reference clock signal with a detected clock signal generated from a decoder output signal from said decoder, said controller configured for controlling said spindle motor at the constant linear velocity in accordance with a phase comparator output signal from said phase comparator, wherein the linear velocity of said spindle motor is variably adjusted by said controller in accordance with the external control signal when information data is recorded on the disc along the pre-groove.

2. A recording apparatus according to claim 1, wherein said decoder comprises a band pass filter and a demodulator, said band pass filter coupled to receive a push-pull component of the output signal from said head device and being configured to extract a high frequency component of the push-pull component, and said demodulator being configured for FM demodulating a filter output signal from said band pass filter to generate the decoder output signal.

3. A recording apparatus according to claim 2, wherein said controller comprises:

an edge detecting circuit which is coupled to receive the decoder output signal from said demodulator, a further phase comparator coupled to receive an edge detector supplied output signal from said edge detecting circuit, a low pass filter coupled to receive a further phase comparator output signal from said further phase comparator, and a voltage controlled oscillator coupled to receive a low pass filter output signal from said low pass filter, wherein a voltage controlled output signal from the voltage controlled oscillator is the detected clock signal and the voltage controlled signal is supplied to the phase comparator.

4. A recording apparatus according to claim 1, wherein said clock generator comprises an oscillator for generating the fundamental clock signal and a divider for variably dividing the fundamental clock signal based on the external control signal.

5. A recording apparatus for recording data on an optical recordable disc which is formed with a pre-groove wobbled in a radial direction thereof by a wobbling signal generated by address data and a carrier signal, said carrier signal having a predetermined frequency, said recording apparatus comprising:

a spindle motor for rotationally driving the disc at a constant linear velocity in a range from 1.2 m/sec to 1.4 m/sec;

a head device for recording information data on the disc along the pre-groove and for reading out an information signal from the disc, said head device being configured for scanning the pre-groove of the disc;

an FM demodulator coupled to receive an output signal from the head device which is obtained by scanning the pre-groove and configured for extracting the carrier signal from the output signal received from said head device;

a clock generator for generating a reference clock signal by variably dividing a fundamental clock signal according to an external control signal, where the external control signal is defined by a desired recording capacity and a desired error rate for recording the information data on the disc; and a controller coupled to the clock generator and to the FM demodulator, and having a phase comparator for comparing the reference clock signal with a detected clock signal generated from a demodulator output signal from said FM demodulator, said controller configured for controlling said spindle motor at the constant linear velocity in accordance with a phase comparator output signal from said phase comparator, wherein the linear velocity of said spindle motor is variably adjusted by said controller in accordance with the external control signal when information data is recorded on the disc along the pre-groove.

6. A recording apparatus according to claim 5, wherein said controller comprises an edge detecting circuit which is coupled to receive the demodulator output signal from said FM demodulator, a further phase comparator coupled to receive an edge detector output signal from said edge detection circuit, a low pass filter coupled to receive a further phase comparator output signal from said further phase comparator, and a voltage controlled oscillator coupled to receive a low pass filter output signal from said low pass filter, wherein a voltage controlled output signal from the voltage controlled oscillator is supplied to said phase comparator.

7. A recording apparatus according to claim 5, wherein said clock generator comprises an oscillator for generating the fundamental clock signal and a divider for variably dividing the fundamental clock signal based on the external control signal.

* * * * *